(12) United States Patent
Tafuni et al.

(10) Patent No.: US 12,025,009 B2
(45) Date of Patent: Jul. 2, 2024

(54) SHUT-OFF VALVE

(71) Applicant: Microtecnica S.r.l., Turin (IT)

(72) Inventors: Domenico Tafuni, Turin (IT); Pierpaolo Mangione, Turin (IT)

(73) Assignee: MICROTECNICA S.R.L., Turin (IT)

( * ) Notice: Subject to any disclaimer, the term of this patent is extended or adjusted under 35 U.S.C. 154(b) by 94 days.

(21) Appl. No.: 17/958,873

(22) Filed: Oct. 3, 2022

(65) Prior Publication Data
US 2023/0175399 A1    Jun. 8, 2023

(30) Foreign Application Priority Data
Dec. 8, 2021   (EP) .................................. 21213197

(51) Int. Cl.
| | |
|---|---|
| F16K 11/07 | (2006.01) |
| F01B 3/00 | (2006.01) |
| F01B 25/10 | (2006.01) |
| F16K 27/04 | (2006.01) |

(52) U.S. Cl.
CPC ............ F01B 25/10 (2013.01); F01B 3/0002 (2013.01); F16K 11/07 (2013.01); F16K 27/041 (2013.01)

(58) Field of Classification Search
CPC .... F16K 11/07; F16K 11/0716; F16K 27/041; F01B 25/10; F01B 3/002; F16H 61/4069; F16H 61/4035; F16H 61/4183; F15B 2211/20515; F15B 2211/3056; F15B 2211/3111; F15B 2211/70–7058
See application file for complete search history.

(56) References Cited

U.S. PATENT DOCUMENTS

| | | |
|---|---|---|
| 6,193,490 B1 | 2/2001 | White |
| 6,808,162 B2 | 10/2004 | Tranovich et al. |
| 7,854,402 B1 | 12/2010 | Travis |
| 8,459,972 B2 | 6/2013 | Buel |
| 8,640,723 B2 | 2/2014 | Jacobsen et al. |
| 2005/0120873 A1 | 6/2005 | Gray, Jr. |

(Continued)

FOREIGN PATENT DOCUMENTS

| | | |
|---|---|---|
| JP | H11236968 A | 8/1999 |
| JP | 2007198395 A | 8/2007 |

OTHER PUBLICATIONS

Abstract for JPH11236968 (A), Published: Aug. 31, 1999, 1 page.

(Continued)

*Primary Examiner* — Kelsey E Cary
(74) *Attorney, Agent, or Firm* — CANTOR COLBURN LLP

(57) ABSTRACT

A valve for controlling the flow of hydraulic fluid to a hydraulic motor. The valve includes a sleeve and a spool. The sleeve includes a first fluid flow port for receiving hydraulic fluid from the supply line; a second fluid flow port for supplying hydraulic fluid to a second valve; a third fluid flow port for receiving hydraulic fluid from a first control line; a fourth fluid flow port for receiving hydraulic fluid from a second control line; and a fifth fluid flow port in fluid communication with the return line. The valve is arranged to be actuated to move the spool between a first position and a second position. When the spool is in the second position, the fifth fluid flow port is in fluid communication with the second, third and fourth fluid flow ports and the first fluid flow port is closed by the spool.

15 Claims, 8 Drawing Sheets

(56) References Cited

U.S. PATENT DOCUMENTS

| | | | |
|---|---|---|---|
| 2013/0094986 A1 | 4/2013 | Prigent et al. | |
| 2017/0306989 A1* | 10/2017 | Coolidge | F15B 11/161 |
| 2017/0307096 A1* | 10/2017 | Janecke | F16K 11/10 |
| 2018/0334784 A1* | 11/2018 | Fukuda | F15B 21/14 |
| 2019/0119879 A1* | 4/2019 | Fukuda | E02F 9/2228 |
| 2021/0285554 A1* | 9/2021 | Orimoto | E02F 9/2267 |

OTHER PUBLICATIONS

Abstract JP2007198395 (A), Published: Aug. 9, 2007, 1 page.
European Search Report for Application No. 21213197.3, mailed Jun. 3, 2022, 7 pages.

* cited by examiner

SHUT-OFF VALVE

CROSS-REFERENCE TO RELATED APPLICATIONS

This application claims priority to European Patent Application No. 21213197.3 filed Dec. 8, 2021, the entire contents of which is incorporated herein by reference.

FIELD

This disclosure relates to an improved valve for hydraulic motor systems and also to a hydraulic motor system using the valve.

BACKGROUND

Hydraulic motors use hydraulic fluid flow and pressure to drive mechanical actuation systems. Typically, valves are used for controlling the operation of hydraulic motor systems. Where some valves may continuously vary the flow of hydraulic fluid through the hydraulic motor to continuously adjust the speed of the motor, others (e.g. shut-off valves) simply either stop or start the flow of hydraulic fluid to the motor.

In some hydraulic motors (e.g. axial piston motors), pressure spikes and pressure imbalances can cause piston shoes to lift from the cam plate or swash plate. This pressure difference is more likely to occur in designs that use a spring-based mechanism for keeping the pistons in contact with the plate on the intake stroke. Piston shoe lift can be followed up by a hard landing against the cam or swash plate that often causes damage to the motor.

Case drain lines are provided in some existing hydraulic motors to relieve excess pressure, draining leaked hydraulic fluid back to the return line. However, due to trapped return pressure in motor control lines and increases in case drain pressure, e.g. upon closing of shut-off valves, case drain lines are unable to prevent such pressure spikes/imbalances.

Improved valves for preventing pressure imbalances, which therefore reduce the likelihood of motor damage in a hydraulic motor system, are desirable.

SUMMARY

According to this disclosure, there is provided a first valve, for controlling the flow of hydraulic fluid therethrough, arranged to be mounted in a hydraulic motor system. The first valve includes: a substantially cylindrical sleeve; and a spool within the sleeve and arranged for linear motion along a first axis, the sleeve and the spool being coaxial along the first axis. The sleeve comprises: a first fluid flow port for receiving hydraulic fluid from a supply line; a second fluid flow port for supplying hydraulic fluid to a second valve for control of a hydraulic motor; a third fluid flow port for receiving hydraulic fluid from a first control line in fluid communication with an first control port of the hydraulic motor; a fourth fluid flow port for receiving hydraulic fluid from a second control line in fluid communication with a second control port of the hydraulic motor; and a fifth fluid flow port in fluid communication with a return line, the return line being in fluid communication with a case drain line from the hydraulic motor. The first valve is arranged to be actuated to move the spool between a first position and a second position, wherein when the spool is in the second position, the fifth fluid flow port is in fluid communication with the second, third and fourth fluid flow ports and the first fluid flow port is closed by the spool.

In some embodiments, the hydraulic motor system comprises: the hydraulic motor; the supply line and the return line (e.g. for the supply and return of hydraulic fluid to and from the hydraulic motor); and the case drain line.

Also according to this disclosure, there is provided a hydraulic motor system that includes a first valve, for controlling the flow of hydraulic fluid therethrough, a hydraulic motor, a supply line and a return line for the supply and return of hydraulic fluid to and from the hydraulic motor and a case drain line, from the hydraulic motor, in fluid communication with the return line. The system also includes a first control line in fluid communication with a first control port of the hydraulic motor and the first valve and a second control line in fluid communication with a second control port of the hydraulic motor and the first valve. The first valve includes: a substantially cylindrical sleeve; and a spool within the sleeve and arranged for linear motion along a first axis, the sleeve and the spool being coaxial along the first axis. The sleeve includes: a first fluid flow port for receiving hydraulic fluid from the supply line; a second fluid flow port for supplying hydraulic fluid to a second valve for control of the hydraulic motor; a third fluid flow port for receiving hydraulic fluid from the first control line; a fourth fluid flow port for receiving hydraulic fluid from the second control line; and a fifth fluid flow port in fluid communication with the return line. The first valve is arranged to be actuated to move the spool between a first position and a second position, wherein when the spool is in the second position, the fifth fluid flow port is in fluid communication with the second, third and fourth fluid flow ports and the first fluid flow port is closed by the spool.

The first valve is arranged to control (e.g. permit, restrict or prevent as needed) a flow of hydraulic fluid to a hydraulic motor to thereby control operation of the hydraulic motor. It does this by a spool opening and closing fluid flow paths in the sleeve of the valve. Thus, the first valve may be actuated to move the spool between a first (e.g. open) position and a second (e.g. closed) position.

When the spool is in the second position the fifth fluid flow port is in fluid communication with the second, third and fourth fluid flow ports and the first fluid flow port is closed (i.e. isolated from the second, third, fourth and fifth fluid flow ports) by the spool. As the fifth fluid flow port is in fluid communication with the return line, this means that the second, third and fourth fluid flow ports are also put into fluid communication with the return line when the spool is in the second position.

In a set of embodiments, the first valve comprises a sixth fluid flow port for returning hydraulic fluid from the second valve. In some embodiments, when the spool is in the second position, the fifth fluid flow port is in fluid communication with the sixth fluid flow port.

In a set of embodiments, when the spool is in the first position, the first fluid flow port is in fluid communication with the second fluid flow port and each of the third, fourth and fifth fluid flow ports are closed (i.e. isolated from each other). In embodiments comprising a sixth fluid flow port, when the spool is in the first position, the fifth fluid flow port is in fluid communication with the sixth fluid flow port. Thus, the spool, when in the first position, allows hydraulic fluid to flow through the first valve, e.g. from the supply line to the supply port of the second valve (e.g. a servo valve).

Therefore, in such a set of embodiments, when the spool is in the first position, the first valve is in an open state enabling a flow of hydraulic fluid from the supply line to the second valve or to the hydraulic motor. Whereas, in some embodiments, when the spool is in the second position, the first valve is in a closed state, preventing a flow of hydraulic fluid from the supply line to the second valve or to the hydraulic motor.

In a set of embodiments, when the spool is in the second position, the pressure at the first control port (e.g. inlet or outlet) of the hydraulic motor, the pressure at the second control port (e.g. inlet or outlet) of the hydraulic motor, the pressure of the case drain line and the pressure of the return line are equalised.

When the spool is in the second position, the first fluid flow port is isolated from the second, third, fourth and fifth fluid flow ports, which means that the supply of hydraulic fluid to the second valve (e.g. a control valve for the hydraulic motor) is stopped. Therefore, the valve is effectively a shut-off valve. However, the case drain line and the second, third, fourth and fifth fluid flow ports are all in fluid communication with the return line of the hydraulic motor system, which allows their pressures to be equalised.

A hydraulic motor converts hydraulic pressure into torque and rotary motion. As described above, the hydraulic motor comprises a first control port and a second control port. These first and second control ports provide the inlet and outlet of the hydraulic motor In fact, either of the first and second control port could provide the inlet (supply) or the outlet (return) depending on the direction of rotation of the hydraulic motor (i.e. clockwise or counter clockwise). Therefore, the inlet and outlet port for the motor is strictly linked to the rotation direction. The inlet and outlet may switch between the control ports of the motor (e.g. by means of the electrohydraulic servo valve) to reverse the direction of rotation. The first control port may be the port of the hydraulic motor in fluid communication with the supply line. The second control port may be the port of the hydraulic motor in fluid communication with the return line. The hydraulic motor may be an axial piston motor.

The hydraulic motor may comprise a plurality of pistons (e.g. within a rotatable cylinder block) each having an associated piston shoe. In a set of embodiments, the hydraulic motor comprises a (e.g. cam or swash) plate over which the plurality of piston shoes are arranged to slide. The plate may be stationary in relation to the pistons. In such a set of embodiments, the plate may be tilted at an angle with respect to the transverse cross-sectional plane of the pistons (e.g. at angle of between 10° and 70°—e.g. between 20° and 50°). The angle at which the plate is tilted may be adjustable.

The pistons may slide over the plate. Existing hydraulic motors typically require each piston shoe to stay in contact with the plate as it slides, during normal operation. 'Staying in contact' may be understood to mean that the piston shoes slide against the plate without exceeding a threshold distance from the plate (e.g. 5 mm, e.g. 3 mm, e.g. 2 mm, e.g. 1 mm, e.g. 0.05 mm, e.g. 0.01 mm), A thin layer of hydraulic fluid (e.g. oil) is typically present between the piston shoe and the plate. Therefore 'staying in contact' may be understood to mean any moment when the force urging the pistons to the plate and the force pushing the pistons away from the plate are substantially balanced, e.g. to within 1%, e.g. to within 5%, e.g. to within 10%, e.g. to within 20%.

Thus, the hydraulic motor may comprise a hold-down plate for holding a face of the piston shoe to the plate. However, in a set of embodiments, the hydraulic motor comprises a spring-based mechanism arranged to bias the plurality of pistons toward the plate. The spring-based mechanism may comprise a spring positioned within a cylinder block that holds the pistons. The longitudinal axis of the spring may be coaxial with the longitudinal axis of the cylinder block. The spring may be arranged to apply a spring force axially with respect to the longitudinal axis of the pistons toward the (e.g. cam or swash) plate. The spring-based mechanism may also comprise a hold down surface that interfaces with a surface of the piston shoe so that the piston shoe is held to the (e.g. cam or swash) plate by the hold down surface.

Spring forces directed toward the plate may be overcome by an increase (e.g. spike) in case drain pressure. Therefore, spring-based hold down mechanisms may be more prone to piston shoe lift. Hydraulic motors that use such a spring-based mechanism in this way, may be more compact. Therefore, embodiments may help to overcome case drain overpressure in compact hydraulic motors and thus helps to make compact hydraulic motors more reliable and robust.

The first valve may help to prevent case drain overpressure by allowing the pressure across the faces of the pistons in the hydraulic motor to be equalised. This helps to prevent the possibility of the pistons being pushed away from the stationary (e.g. swash or cam) plate by case drain overpressure and keeps the piston shoes in contact with the plate, thus helping to reduce the possibility of damage to the piston shoes and/or the motor.

The supply line and the return line may be for the supply and return of hydraulic fluid (pressure) to and from a Power Drive Unit (PDU). The supply line may allow pressurised hydraulic fluid to flow from a hydraulic pressure source (e.g. an oil tank) to the hydraulic motor via one or more components (e.g. a plurality of valves). The return line may allow pressurised hydraulic fluid to flow from the hydraulic motor to a reservoir.

As mentioned above, case drain lines from the hydraulic motor help to relieve excess pressure, draining leaked hydraulic fluid back to the return line. In some embodiments, the case drain line is always in fluid communication with the return line (e.g. no matter the position of the spool).

The first control line and second control line may each be respectively branched from a first and a second main hydraulic motor control line (e.g. the main hydraulic motor control lines which supply hydraulic fluid to the hydraulic motor and return hydraulic fluid from the hydraulic motor, e.g. via the second valve, e.g. a control (servo) valve). The first control line may be in fluid communication with the first control port of the hydraulic motor and the third fluid flow port of the first valve. The second control line may be in fluid communication with the second control port of the hydraulic motor and the fourth fluid flow port of the first valve.

As mentioned above the first valve comprises a substantially cylindrical sleeve within which the spool is arranged for linear motion along the first axis, the sleeve and the spool being coaxial along the first axis (the main cylindrical axis). The sleeve may comprise a sleeve wall comprising an inner surface and an outer surface. The inner surface of the sleeve wall may define a substantially cylindrical cavity within which the spool is positioned. In a set of embodiments, the sleeve wall has a variable thickness and/or the inner surface of the sleeve wall has a variable distance from the first axis.

In a set of embodiments, the inner surface of the sleeve wall comprises one or more protrusions for interfacing with one or more of the stops of the spool. In some of embodiments, the stops are arranged to interface with the one or more protrusions, so that one or more of the stops register with the inner surface of the sleeve wall at the protrusions, preventing or substantially preventing fluid flow past each of the one or more stops.

This helps to allow a stop to register with the inner surface of the sleeve. For example, where there is a protrusion or where the sleeve wall is thicker or the inner surface is closer to the spool, a stop may more easily 'reach' the inner surface of the wall to interface with part of it and substantially prevent or prevent fluid flow past the stop.

In some embodiments, each stop extends radially (outward) from the first axis (i.e. the main cylindrical axis of the spool). Each stop may also extend azimuthally around the circumference of the spool. Similarly, in some embodiments, each protrusion extends radially (inward) from the circumference of the sleeve wall toward the first axis. Each protrusion may also extend azimuthally around the circumference of the sleeve wall.

The spool may be substantially cylindrical. However, in a set of embodiments the spool comprises a plurality of stops (also known as lands), e.g. the spool may comprise at least three stops—a first stop, a second stop and a third stop. Each of the plurality of stops may extend radially outward toward the inner surface of the sleeve. Each of the plurality of stops may be arranged to interface with a (respective) fluid flow port or part of the inner surface of the sleeve wall (e.g. at a protrusion).

As mentioned above, the first valve is arranged to be actuated to move the spool between a first position and a second position.

When the spool is in the second (e.g. closed) position, the fifth fluid flow port is in fluid communication with the second, third and fourth fluid flow ports and the first fluid flow port is closed (e.g. isolated from the second, third, fourth and fifth fluid flow ports) by the spool.

In a set of embodiments, the fluid flow ports comprise a plurality of apertures in (extending through) the sleeve wall. Each fluid flow port may comprise an inlet and an outlet. Thus, each fluid flow port may comprise two apertures—e.g. one inlet aperture and one outlet aperture. Each inlet aperture may be positioned at the same axial position as its respective outlet aperture (e.g. on opposite sides of the substantially cylindrical sleeve (wall)).

The fluid flow ports may be axially spaced apart along the first axis. Each port may be positioned at the same azimuth angle.

The sleeve may extend between a first end and a second end. For example, the first end may be distal from a return spring and the second end may be proximal to the return spring. The first end may be proximal to the first fluid flow port and the second end may be distal from the first fluid flow port. The first fluid flow port may be the closest of the fluid flow ports to the first end. The fluid flow ports may be axially positioned in the following order: first, second, third, fourth, (sixth) and then fifth—going from the first end to the second end of the sleeve.

As mentioned above, the spool may comprise a first stop, a second stop and a third stop. The first stop may be the stop (out of the first, second, and third stops) most proximal to the first end of the sleeve or the first fluid flow port. The third stop may be the stop most proximal to the second end of the sleeve or the fifth fluid flow port. The second stop may be (e.g. axially) positioned between the first stop and the third stop.

The spool may extend between a first end and a second end. The first end of the spool may be proximal to the first end of the sleeve and distal from the second end of the sleeve. The second end of the spool may be proximal to the second end of the sleeve and distal from the first end of the sleeve. An additional (e.g. fourth) stop may be (e.g. axially) positioned between the first end of the spool and the first stop. The additional stop may prevent or restrict any hydraulic fluid from leaking past the additional stop out of or into the first end of the sleeve.

When the spool is in the first position, the first stop may interface with the inner surface of the sleeve wall of the first valve between the second fluid flow port and the third fluid flow port; the second stop may interface with the inner surface of the sleeve wall between the third fluid flow port and the fourth fluid flow port; and the third stop may interface with the inner surface of the sleeve wall between the fourth fluid flow port and the fifth fluid flow port.

When the spool is in the second position the first stop may interface with the inner surface of the sleeve wall of the first valve between the first fluid flow port and the second fluid flow port. The second stop and the third stop may be positioned so that they do not interface with the inner surface of the sleeve wall.

When the stops interface with part of the inner surface in this way they may prevent or substantially prevent fluid flow past that particular part.

The first valve may be operated by any suitable actuation mechanism. For example, the first valve may be actuated mechanically (e.g. by a button or lever), by electrical control signals, or by a fuse mechanism. In some embodiments, the first valve is pilot operated by a pilot (e.g. solenoid) valve.

The second valve may be an electrohydraulic servo valve.

While embodiments may be used in a range of hydraulic applications, the first valve may be especially useful when mounted in high-lift systems of aircrafts (e.g. slat or flap actuators on airplane wings). This is because embodiments help to address performance and safety problems associated with compact hydraulic motors which use spring-based mechanisms for holding down piston shoes to the hydraulic motor plate. It will be appreciated by those skilled in the art that compact components that are less likely to require repair or replacement are particularly beneficial for the aerospace industry.

Features of any embodiment described herein may, wherever appropriate, be applied to any other embodiment described herein. Where reference is made to different embodiments or sets of embodiments, it should be understood that these are not necessarily distinct but may overlap.

BRIEF DESCRIPTION OF DRAWINGS

One or more non-limiting examples will now be described, by way of example only, and with reference to the accompanying figures in which.

DETAILED DESCRIPTION

Generally, a shut-off valve is arranged to permit or prevent as needed (e.g. in an emergency) a flow of hydraulic fluid to a hydraulic motor. It may do this by changing fluid flow paths therein by movement of a spool relative to fluid flow ports.

Figure 1:
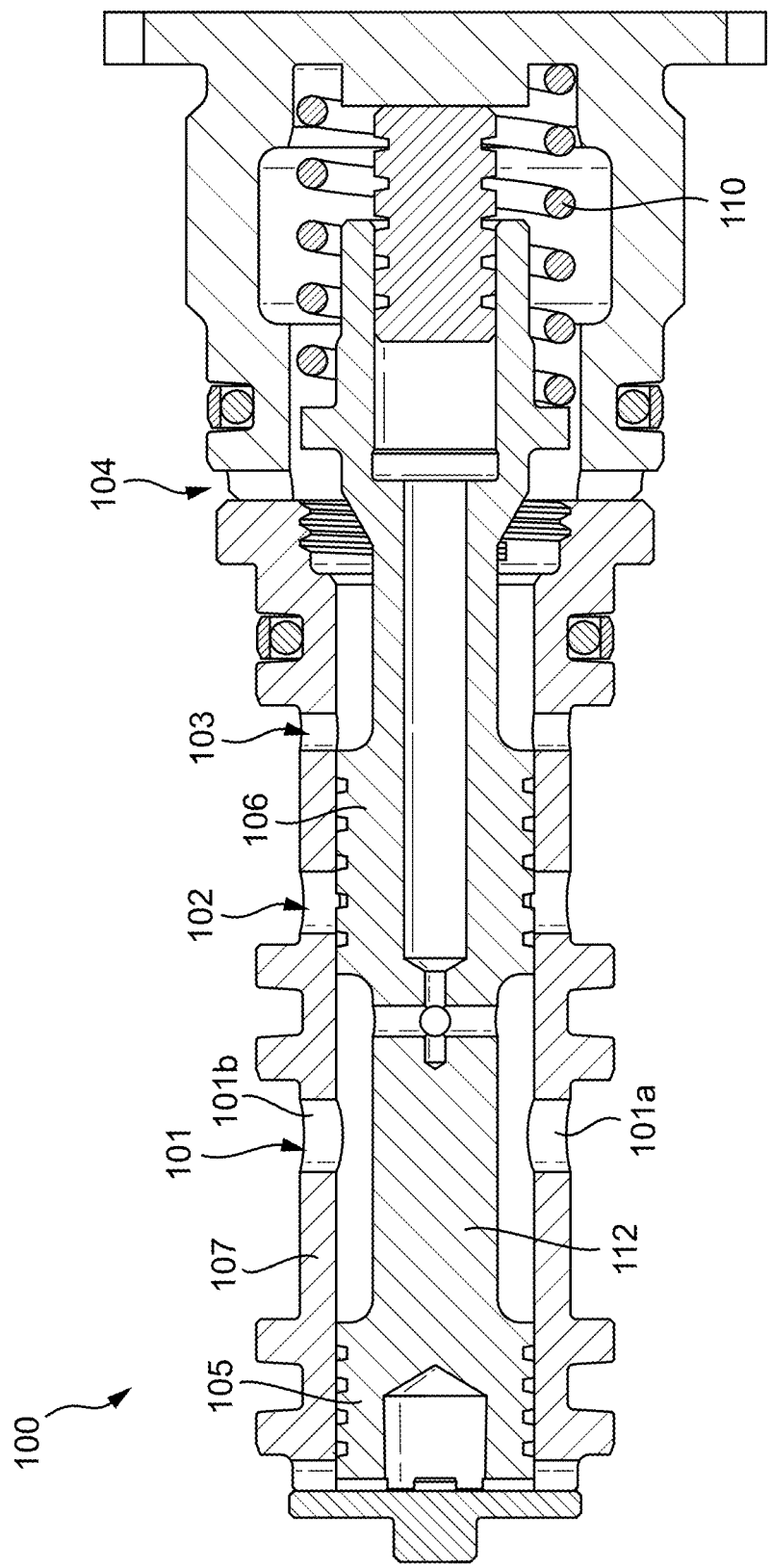
FIG. 1 is an example of a shut-off valve, in a closed state, shown for reference purposes only.

FIG. 1 (prior art) shows, for reference purposes only, a typical design of a shut-off valve 100 having four fluid flow ports 101, 102, 103, 104. A fixed sleeve 107 comprises a system supply port 101, a second valve supply port 102, a second valve return port 103 and a system return port 104. The second valve supply port 102 and the second valve return port 103 are connected to the same supply line of a second valve. The second valve supply port 103 allows flow from the second valve supply to the system return port 104. The electrohydraulic servo valve supply port 102 allows flow to the second valve supply from the system supply port 101. The second valve supply and return ports 102 and 103 are alternatively open and closed depending on the position of the spool 112. The shut-off valve has, moveable with respect to the fixed sleeve 107, a spool 112 which comprises two stops 105, 106 (also known as lands). Each port 101, 102, 103, 104 comprises an inlet (e.g. 101a) and an outlet (e.g. 101b). The valve 100 has a spring return mechanism 110 for returning the spool 112 to its rest position after actuation.

When the spool 112 is in the position shown in FIG. 1, the valve 100 is closed. FIG. 1 shows that the right-most stop 106 registers with the second valve supply port 102 and interfaces with the inner surface of the sleeve 107 between the system supply port 101 and the second valve return port 103. This isolates the first three ports 101, 102, 103 from one another preventing hydraulic fluid flow therebetween.

Figure 2:
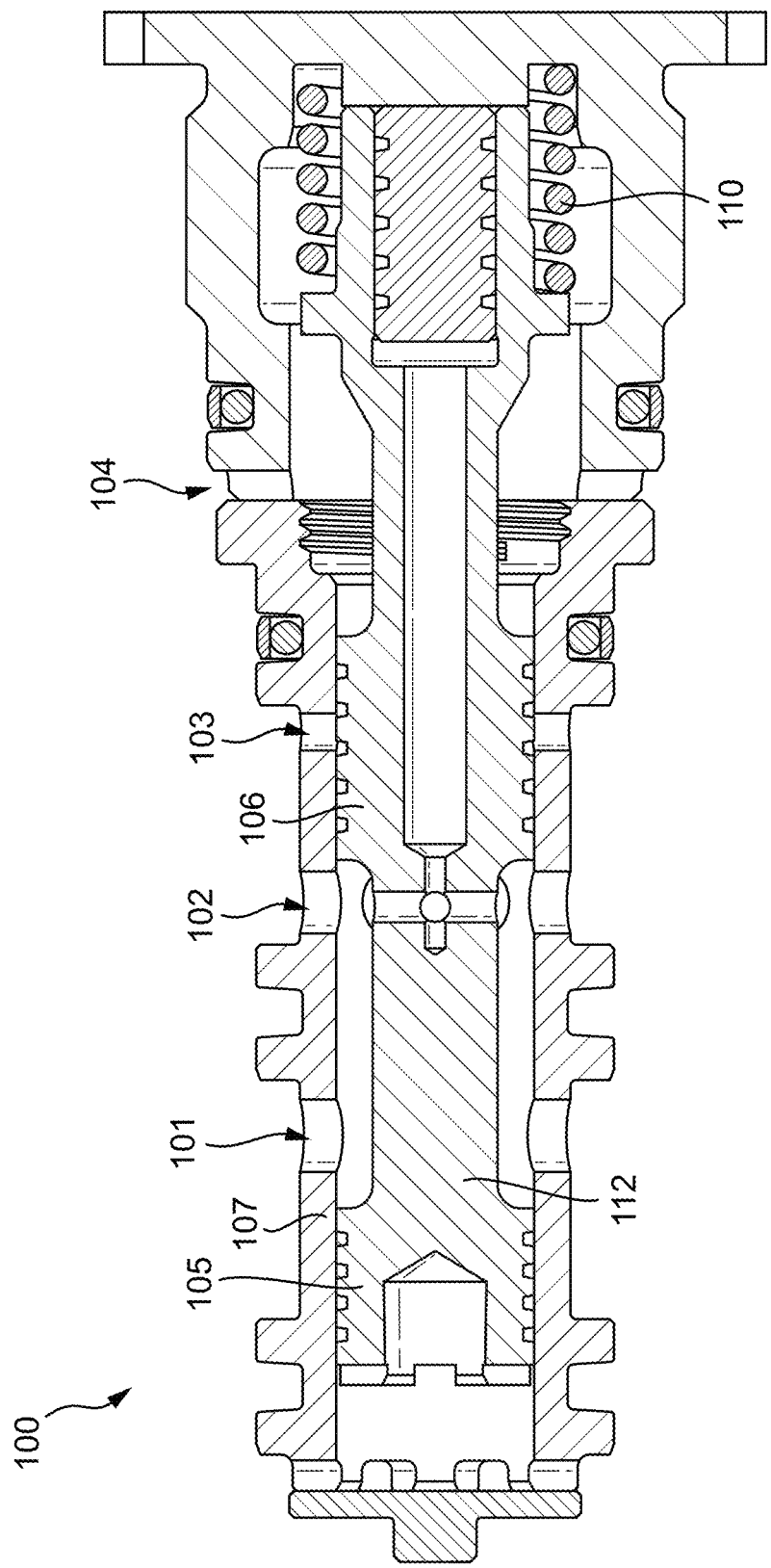
FIG. 2 is the shut-off valve of FIG. 1, in an open state, shown for reference purposes only.

FIG. 2 (prior art) shows the same valve 100 when the spool 112 is moved (to the right), to open the valve, allowing hydraulic fluid flow between the system supply port 101 and the second valve supply port 102. The second valve return port 103 is closed by the right-most stop 106, thus isolating this port from the other ports of the valve.

Figure 3:
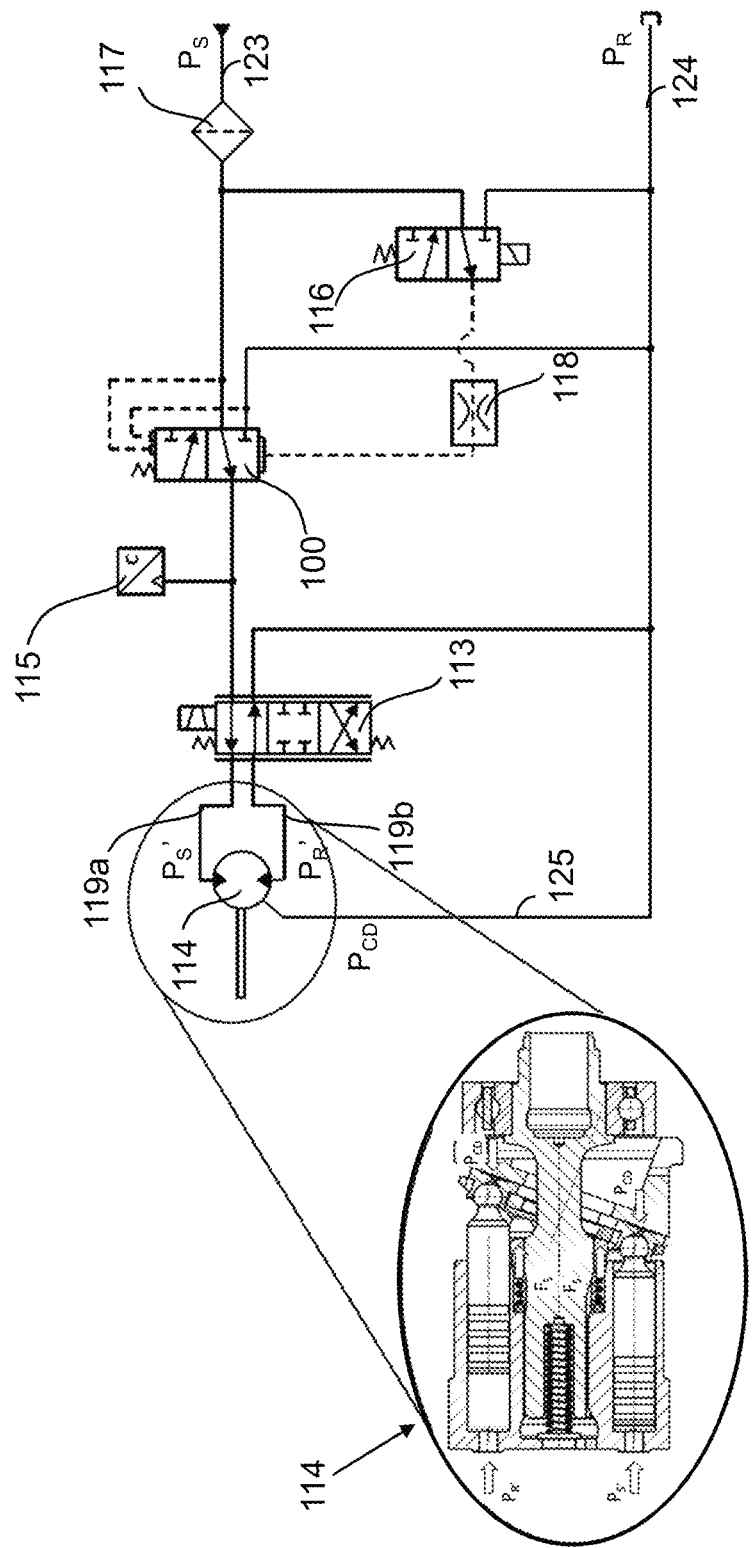
FIG. 3 is a graphical circuit diagram, shown for reference purposes only, of a hydraulic motor system including the shut-off valve of FIG. 2.

FIG. 3 (prior art) is a graphical circuit diagram, shown for reference purposes only, of a hydraulic motor system including the open shut-off valve of FIG. 2.

The hydraulic motor system of FIG. 3 includes a supply line 123 and a return line 124 for the supply and return of hydraulic fluid pressure. The supply line 123 is followed by a filter 117 which feeds two valves: a shut-off valve 100 and a solenoid valve 116. The solenoid valve 116 pilots the shut-off valve 100 via a restrictor 118. Both the shut-off valve 100 and the solenoid valve 116 comprise a return port which may be in fluid communication with the return line 124. When the valves 100, 116 are open, the return port of each valve 100, 116 is isolated (or closed)—as shown in FIG. 1.

Shut-off valves 100 are typically located downstream from the supply line 123 (e.g. via a filter 117), upstream of any control valves (e.g. 113) that adjust the operation of the hydraulic motor 114. The shut-off valve 100 of FIG. 3, is arranged to allow hydraulic fluid to flow to a second valve 113 (when both are open). The second valve 113 is an electrohydraulic servo valve that can be actuated to control the flow of hydraulic fluid pressure to the hydraulic motor 114.

Shut-off valves 100 may have a variety of actuation mechanisms. For example, they may be actuated mechanically (by a button or lever), by electrical control signals, by a fuse mechanism or they may be pilot operated (by a pilot valve). In this example, the shut-off valve 100 is piloted by a solenoid valve 116 (via a restrictor 118).

Figure 4:
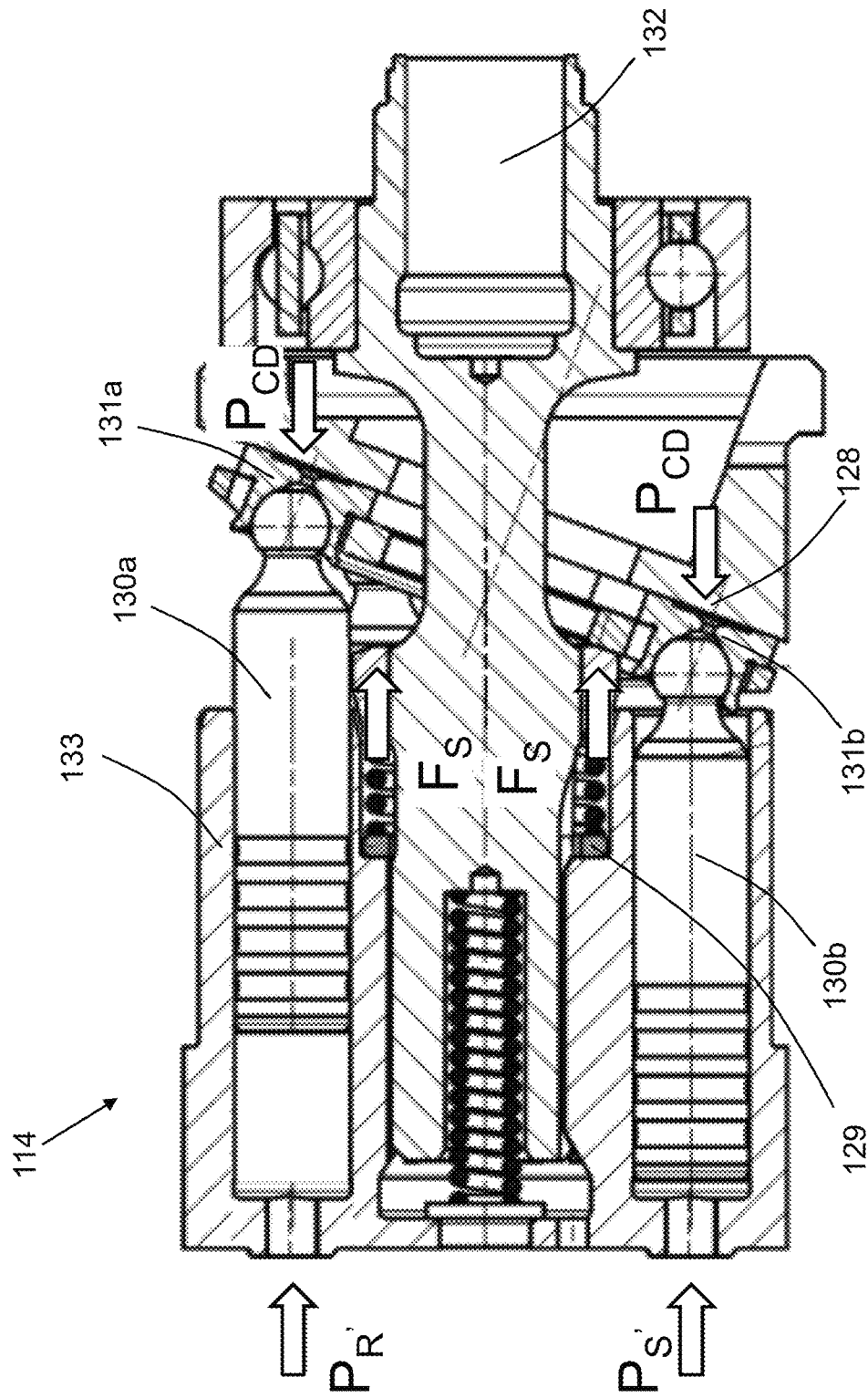
FIG. 4 shows the hydraulic motor of FIG. 3 in more detail.

FIG. 4 (prior art) shows a cross-section of the (axial piston) hydraulic motor 114 of FIG. 3. The hydraulic motor 114 converts hydraulic pressure into torque and rotary motion. The hydraulic motor 114 comprises a stationary (e.g. cam or swash) plate 128 and a piston cylinder block 133 arranged to rotate and drive the drive shaft 132.

The hydraulic motor 114 comprises a plurality of pistons 130a, 130b each having an associated piston shoe 131a, 131b. As the hydraulic pressure acts to reciprocate the pistons 130a, 130b, the piston shoes 131a, 131b are arranged to slide over the tilted plate 128 allowing the cylinder block 133 to rotate to drive the driveshaft. As can be seen in FIG. 4, the plate 128 is tilted at an approximately 45° angle to the cross-sectional plane of the pistons 130a, 130b (i.e. the axis along which the pistons reciprocate is normal to this cross-sectional plane).

Existing hydraulic motors typically require the piston shoe 131a, 131b to stay in contact with the plate as it slides, during normal operation. A thin layer of hydraulic fluid (e.g. oil) is present between the piston shoe and the plate. This oil is considered to be at case drain pressure. The hydraulic motor of FIG. 4 includes a spring-based hold-down mechanism for holding the piston shoe 131a, 131b to the plate.

Each piston of the hydraulic motor works under dynamic balance between the supply pressure (PS') or return pressure (PR'); the case drain pressure (PCD); and the internal spring force (FS). During operation of the hydraulic motor 114, PCD must be less than or equal to PR', in order to ensure the piston is held down on the plate 128.

Spring forces and hydraulic fluid pressure directed toward the plate may be overcome by an increase (e.g. a spike) in case drain pressure. Thus, spring-based hold down mechanisms may be more prone to piston shoe lift compared to those using a rigid hold down mechanism. However, hydraulic motors that use such a spring-based mechanism in this way, often have the advantage of being more compact and having a smaller dimensional envelope. Therefore, embodiments may help to overcome case drain overpressure in compact hydraulic motors and thus helps to make compact hydraulic motors more reliable and robust.

As discussed above, embodiments may help to prevent unwanted movement of pistons 130a, 130b away from the stationary plate 128. This movement may be due to return pressure (PR') being trapped in one of the motor control lines 119a, 119b and/or an increase in case drain pressure (PCD). In particular, the increase of the case drain pressure may be due to the electrohydraulic servo valve 113 supply line discharge in the return line 123 upon closure of the shut-off valve 100.

Figure 5:
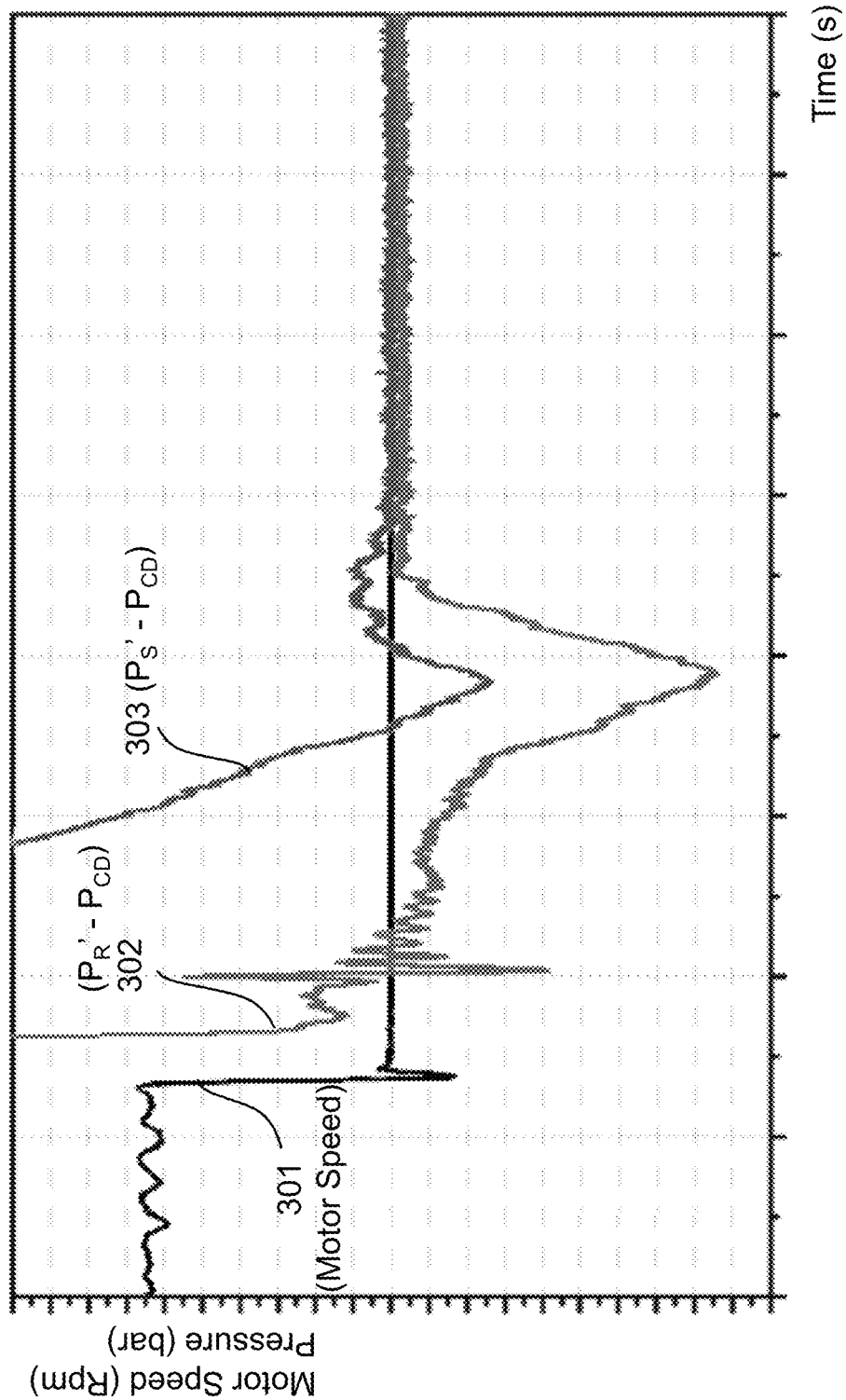
FIG. 5 is a graph showing the pressure spike that can occur in the hydraulic motor of FIG. 4.

FIG. 5 shows a graph of the pressure spike that may occur upon the closure of the typical shut-off valve 100 of FIGS. 1 and 2. The graph shows 'Motor Speed (Rpm)' and 'Pressure (bar)' on the y-axis and 'Time (s)' on the x-axis. Three lines are plotted—a first line represents motor speed 301, a second represents the pressure difference between the outlet of the motor and the case drain (PR'−PCD) 302 and a third represents the pressure difference between the inlet of the motor and the case drain (PS'−PCD) 303.

It can be seen that upon closure of the shut-off valve 100, the motor stops and there is a drop in motor speed down to zero, as expected. However, following that, there is a negative spike in the pressure differences (PR'−PCD) 302 and (PS'−PCD) 303. This indicates that the initially high pressures at the inlet and outlet of the hydraulic motor drop way below the case drain pressure (PCD). An especially large negative spike can be seen in the difference between the outlet of the motor and the case drain (PR'−PCD). This may be attributed to the servo valve 113 supply discharge and the isolation of the hydraulic motor control lines 119a, 119b.

Figure 6:
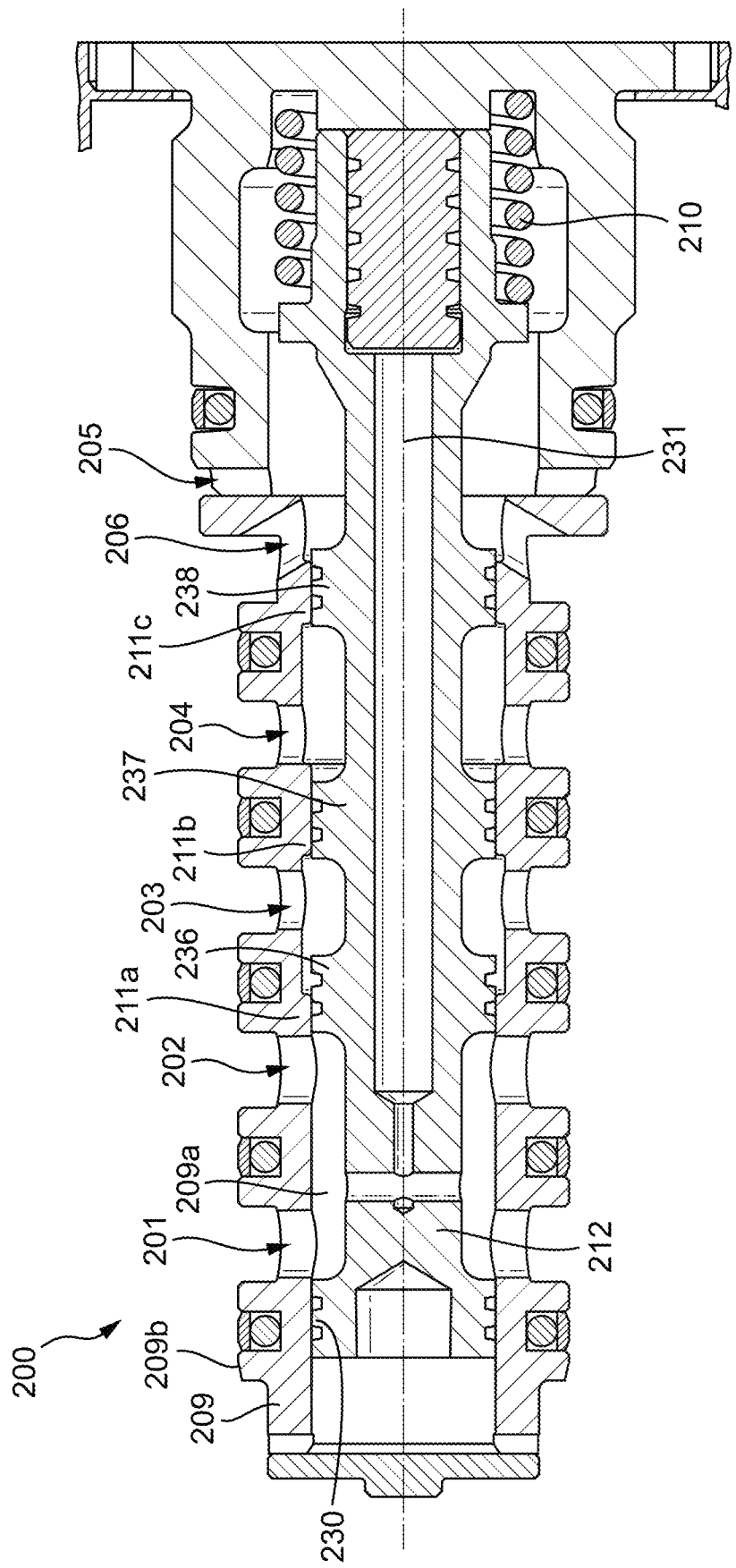
FIG. 6 shows a shut-off valve in an open state.
Figure 7:
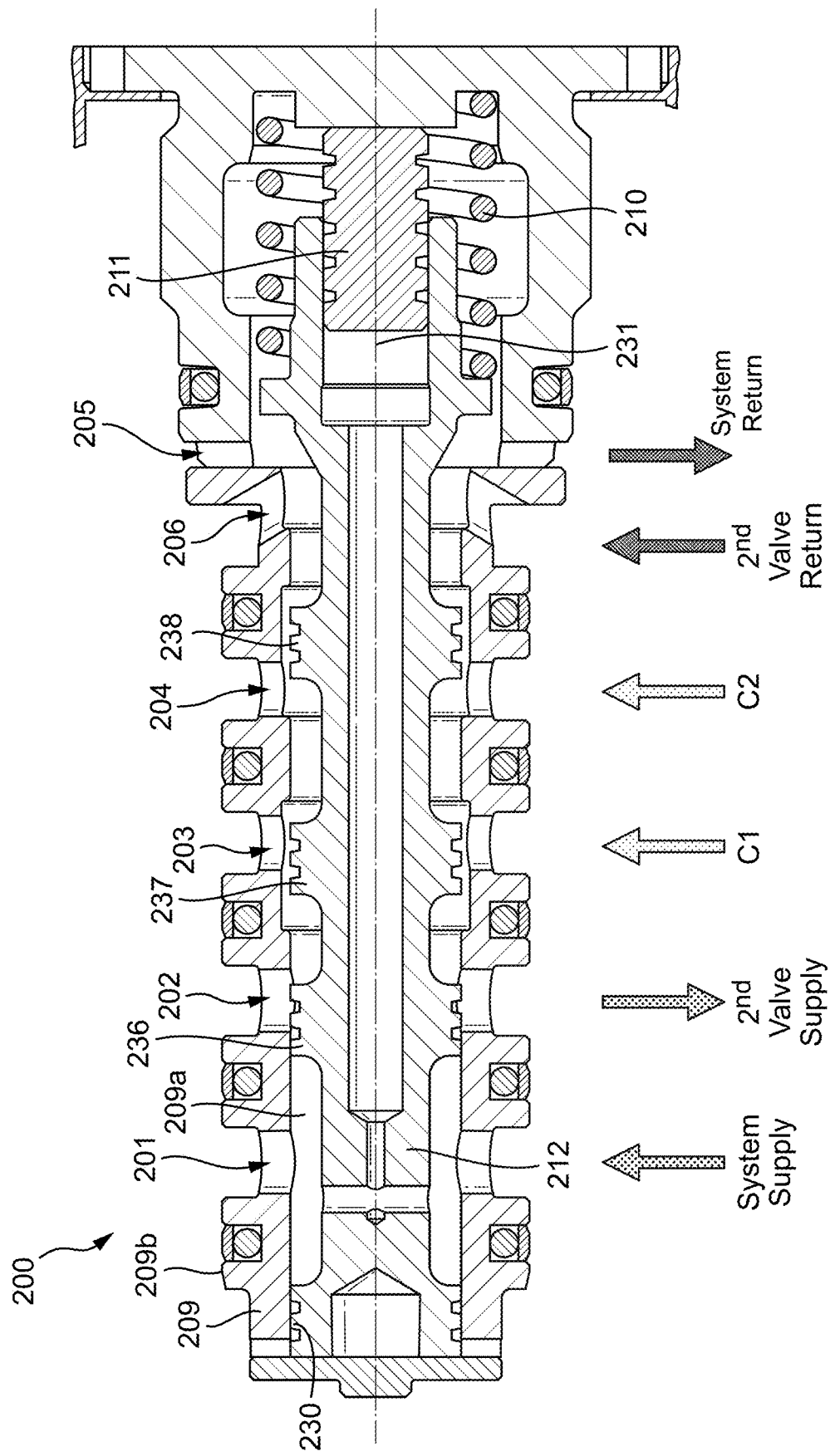
FIG. 7 is the shut-off valve of FIG. 6, in a closed state.
Figure 8:
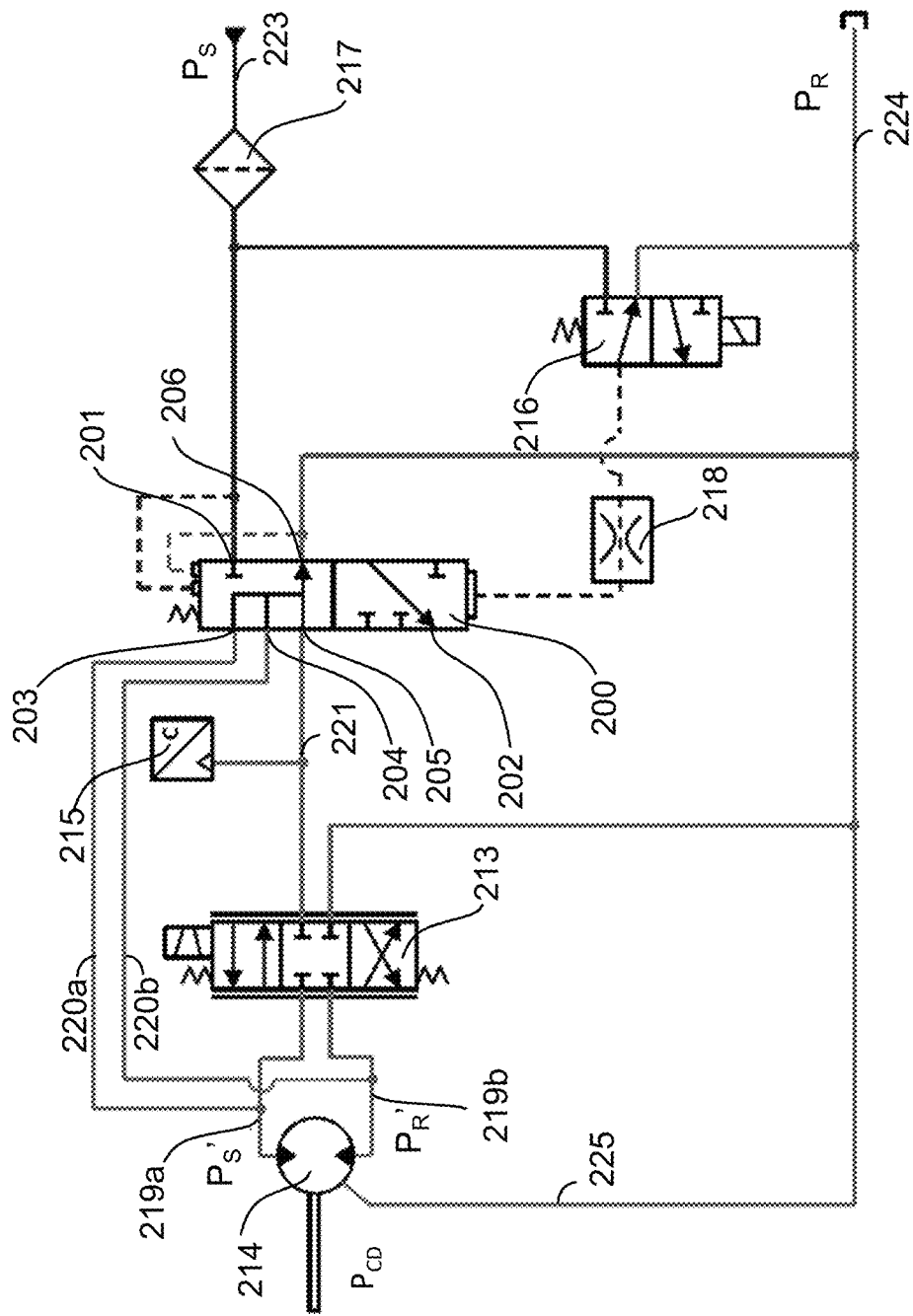
FIG. 8 is a graphical circuit diagram of a hydraulic motor system comprising the shut-off valve of FIGS. 6 and 7 in a closed state.

In order to avoid the negative spike shown in FIG. 5, the Applicant proposes an improved shut-off valve 200 and hydraulic motor system as shown in FIGS. 6 to 8.

FIGS. 6 and 7 show cross-sections through a shut-off valve (i.e. the first valve) 200. FIG. 6 shows the valve 200, opened, i.e. wherein the spool is in the first position, and FIG. 7 shows the same valve, closed, i.e. wherein the spool is in the second position.

The valve 200 includes a substantially cylindrical sleeve 209 and a spool 212, within the sleeve 209, arranged for linear motion along a first axis (the main cylindrical axis) 231, the sleeve 209 and the spool 212 being coaxial along the first axis 231. The sleeve 209 has a sleeve wall which has an inner surface 209a and an outer surface 209b.

In contrast to existing designs, the sleeve 209 includes a first fluid flow port 201 for receiving hydraulic fluid from the supply line 223; a second fluid flow port 202 for supplying hydraulic fluid to a second valve 213 for control of the hydraulic motor 214; a third fluid flow port 203 for receiving hydraulic fluid from a first control line 220a in fluid communication with a first control port of the hydraulic motor 214; a fourth fluid flow port 204 for receiving hydraulic fluid from a second control line 220b in fluid communication with a second control port of the hydraulic motor 214; and a fifth fluid flow port 205 in fluid communication with the return line 224. There is also a sixth fluid flow port 206 for returning hydraulic fluid from the second valve 213, positioned between the fourth fluid flow port 204 and the fifth fluid flow port 205.

The sleeve 209 extends between a first end and a second end, (e.g. the first end being distal from the return spring 211 and the second end being proximal to the return spring 210). It is shown in FIG. 7 that the first end is proximal to the first fluid flow port 201 and the second end is distal from the first fluid flow port 201. The first fluid flow port 201 is the closest of the fluid flow ports to the first end. The fluid flow ports 201, 202, 203, 204, 205, 206 are axially positioned in the following order: first 201, second 202, third 203, fourth 204, sixth 206 and then fifth 205—going from the first end to the second end of the sleeve 209.

A return (compression) spring 210 at one end of the valve 200 compresses when the spool 212 is moved to the right (i.e. the first position) and relaxes when the spool 212 is moved to the left (i.e. the second position). The spool includes stops (or lands) 236, 237, 238 that register with (e.g. protrusions on) the inner surface 209a of the sleeve wall to prevent fluid communication between certain fluid flow ports. Based on the position of the stops 236, 237, 238 in relation to the fluid flow ports 201, 202, 203, 204, 205, 206 (which is determined by the position of the spool 212), a fluid flow port can be isolated from one or more of the other fluid flow ports or can be made to be in fluid communication with one or more of the other fluid flow ports.

The spool 212 according to the embodiment of FIGS. 6 to 8, comprises two additional stops compared to existing shut-off valves 100. Despite the additional ports and stops within the valve 200, the improved shut-off valve 200 has the same dimensional envelope and so may take up no more space than existing simpler valves which only have four ports.

The spool 212 comprises a first stop 236, a second stop 237 and a third stop 238. The first stop 236 may be the stop; out of the first 236, second 237, and third 238 stops; most proximal to the first end of the sleeve 209 or the first fluid flow port 201. The third stop 238 may be the stop most proximal to the second end of the sleeve 209 or the fifth fluid flow port 205. The second stop 237 may be positioned (e.g. axially) between the first stop 236 and the third stop 238. An additional (e.g. fourth) stop 230 is positioned at the end of the sleeve 209 between the first end of the sleeve and the first stop 236.

Furthermore, in contrast to the valve 100 of FIGS. 1 and 2, the valve 200 comprises three protrusions 211a, 211b, 211c. Here, the inner surface 209a of the sleeve wall is closer to the spool than the rest of the inner surface 209a of the sleeve wall. The protrusions 211a, 211b, 211c help the stops (or lands) to 'reach' and register with the inner surface 209a of the sleeve wall. The stops may also easily separate from the inner surface 209a when they are moved away from the protrusions 211a, 211b, 211c (when the valve 200 is opened).

FIG. 8 shows the shut-off valve 200 (i.e. the first valve) (see FIGS. 6 and 7) mounted in a hydraulic motor system. The hydraulic motor system of FIG. 8 has many of the same features shown in FIG. 3—e.g. there is a supply line 223 and a return line 224 for the supply and return of hydraulic fluid to and from the hydraulic motor 214 and a case drain line 225, from the hydraulic motor 214, in fluid communication with the return line 224. Similarly to FIG. 3, there is a filter 217, a hydraulic motor 214, an electrohydraulic servo valve 213; a pressure sensor 215, and a solenoid valve 216 for piloting the shut-off valve 200 via a restrictor 218.

In contrast to the system of FIG. 3, the first and second control lines 220a, 220b are branched from the main control lines 219a, 219b which may be in fluid communication with the first control port and second control port of the motor 214.

The operation of the valve 200 will now be described with reference to FIGS. 6, 7 and 8.

The valve 200 is arranged to be actuated between a first 'open' position and a second 'closed' position.

When the spool 212 is in the first position, as shown in FIG. 6, the first fluid flow port 201 is made to be in fluid communication with the second fluid flow port 202 by the spool 212, which allows hydraulic fluid to flow through the shut-off valve 200 from the supply line 223 to the supply port of the second valve 213 (e.g. a servo valve). The third and fourth fluid flow ports 203, 204 are closed, meaning they are individually isolated. The fifth fluid flow port 205 is isolated with the sixth fluid flow port 206 by the spool 212.

In this 'open' arrangement, the (first) stop 236 (third from the right) interfaces with the inner surface 209a of the sleeve wall between the second fluid flow port 202 and the third fluid flow port 203, preventing any fluid flow therebetween. The second stop 237 (second from the right) interfaces with the inner surface 209a of the sleeve wall between the third fluid flow port 203 and the fourth fluid flow port 204 and the third (right-most) stop 238 interfaces with the inner surface 209a of the sleeve wall between the fourth port 204 and the fifth port 205. This, prevents fluid flow between any of the third, fourth and fifth fluid flow ports 203, 204, 205, thus, isolating each of those ports from forming fluid flow paths with each other.

When the spool 212 is in the second position (as shown in FIGS. 7 and 8), the fifth fluid flow port 205 is in fluid communication with the second, third, fourth, fifth and sixth fluid flow ports 202, 203, 204, 206 and the first fluid flow port 201 is closed by the spool 212.

When the first fluid flow port 201 is 'closed' by the spool 212, it is isolated from the other fluid flow ports 202, 203, 204, 205, 206. In this position, the (first) stop 236 (third from the right) interfaces with the inner surface of the sleeve wall between the first fluid flow port 201 and the second fluid flow port 202, preventing or substantially preventing any fluid flow therebetween. This, in turn, helps to prevent fluid flow between the first fluid flow port 201 and any of the other fluid flow ports 203, 204, 205, 206. The other two stops 237, 238 do not interface with the inner surface 209a of the sleeve wall, thus allowing the second, third, fourth, fifth and sixth fluid flow ports 202, 203, 204 to be in fluid communication with each other.

In both cases (when the valve is opened or closed), the stops interface with the protrusions 211a, 211b, 211c of the inner surface 209a of the sleeve wall (see FIG. 6).

Turning back to FIG. 4, the shut-off valve 200 is designed to prevent case drain overpressure by equalising the pressure across the two faces of each piston 130a, 130b in the hydraulic motor 214. This prevents the possibility of the pistons 130a, 130b being pushed away from the swash plate or cam plate by case drain overpressure, i.e. where case drain pressure (PCD)>piston return pressure (PR'). This ensures that PCD<PR', keeping the piston shoes 131a, 131b in contact with the plate, reducing the possibility of damage.

How the shut-off valve 200 of FIGS. 6 to 8 achieves this equalisation of pressure will now be described.

Compared to existing shut-off valves, the valve 200 (i.e. the first valve 200), has two additional ports (i.e. the third and fourth fluid flow ports 203, 204). Each of these additional ports are for receiving hydraulic fluid from control lines 219, 220 that are in fluid communication with the hydraulic motor 214. Actuation of the valve 200 moves the spool 212 between two positions (e.g. to open and close the valve 200). When the spool 212 is in the first (e.g. open) position, the fluid paths through the valve 200 are arranged so that the supply line 223 is in fluid communication with the supply 221 for the second valve 213 and the other fluid flow ports are isolated. This allows the second valve 213 to supply hydraulic fluid to the motor 214 whilst controlling its operation.

When the spool 212 is in the second (e.g. closed) position, the supply line 223 is closed and the control lines 219, 220 which are in fluid communication with the motor 214 are ported to the return line 224. This halts the supply of hydraulic fluid to the motor 214 and equalises the pressure of the lines that are ported to the return line 224 (i.e. in accordance with Pascal's Principle).

The hydraulic motor system includes a case drain line 225 in fluid communication with the return line 224. This means that when the spool 212 is moved to the second position (e.g. upon closure of the first valve), the pressure at the inlet 219a of the hydraulic motor (PS'), the pressure at the outlet 219b of the hydraulic motor (PR'), the pressure of the case drain line 225 (PCD) and the pressure of the return line 224 (PR) are equalised.

In short, the improved shut-off valve 200 allows, at its closure, to port, the second valve (e.g. electrohydraulic servo valve) supply 221; the hydraulic motor control lines 220a, 220b and the hydraulic motor case drain 225 all to the system return 224, thus allowing:

$$P_{CD}=P_R'=P_S'=P_R.$$

Therefore, the condition that causes piston shoe lift (PCD>PR') is prevented as PCD=PR'.

Thus, the first valve 200 helps to prevent case drain overpressure, thus preventing any unwanted pressure imbalance and thus piston shoe lifting which in turn reduces the likelihood of damage to the hydraulic motor 214.

While the shut-off valve 200 may be used in a range of hydraulic applications, the shut-off valve 200 is especially useful when mounted in high-lift systems of aircrafts (e.g. slat or flap actuators on airplane wings). This is because the shut-off valve 200 addresses performance and safety problems associated with compact hydraulic motors. It will be appreciated that compactness is especially beneficial for the aerospace industry. The improved valve 200 architecture relies on the simple single spool technology of classic hydraulic shut-off valves, preventing any risk of a low manufacturing readiness level or technology readiness level.

As mentioned above, in some hydraulic motors, pressure spikes and pressure imbalances can cause piston shoes to lift from the cam plate or swash plate, followed up by a hard landing against the plate that often causes damage to the piston shoes. Case drain lines from the hydraulic motors help to relieve excess pressure, draining leaked hydraulic fluid back to the return line. However, owing to trapped return pressure in motor control lines and increases in case drain pressure, e.g. upon closing of shut-off valves, case drain lines are unable to prevent such pressure spikes/imbalances. This is particularly so where the pressure of the case drain line (PCD) exceeds the pressure at the outlet of the hydraulic motor (PR') (PCD>PR').

Thus it will be seen that, in at least some embodiments, by routing the hydraulic fluid flow path from the second, third and fourth fluid flow ports to the fifth fluid flow port, the pressures of the fluid in that fluid flow path may be equalised. The fifth fluid flow port is in fluid communication with the return line and the case drain line is in fluid communication with the return line. This means that when the spool is moved to the second position (e.g. upon closure of the first valve), the pressure at the inlet of the hydraulic motor (PS'), the pressure at the outlet of the hydraulic motor (PR'), the pressure of the case drain line (PCD) and the pressure of the return line (PR) may be equalised—i.e. PCD=PR'=PS'=PR. Therefore, in embodiments, the condition that causes piston shoe lift (PCD>PR') may be prevented.

Thus, some embodiments may prevent case drain overpressure and in turn reduce the likelihood of damage to the hydraulic motor.

The invention claimed is:

1. A first valve, for controlling the flow of hydraulic fluid therethrough, arranged to be mounted in a hydraulic motor system
the first valve comprising:
    a substantially cylindrical sleeve;
    a spool within the sleeve and arranged for linear motion along a first axis, the sleeve and the spool being coaxial along the first axis;
    wherein the sleeve comprises:
        a first fluid flow port for receiving hydraulic fluid from a supply line;
        a second fluid flow port for supplying hydraulic fluid to a second valve for control of a hydraulic motor;
        a third fluid flow port for receiving hydraulic fluid from a first control line in fluid communication with a first control port of the hydraulic motor;
        a fourth fluid flow port for receiving hydraulic fluid from a second control line in fluid communication with a second control port of the hydraulic motor;
        a fifth fluid flow port in fluid communication with a return line, the return line being in fluid communication with a case drain line from the hydraulic motor;
    wherein the first valve is arranged to be actuated to move the spool between a first position and a second position, wherein when the spool is in the second position, the fifth fluid flow port is in fluid communication with the second, third and fourth fluid flow ports and the first fluid flow port is closed by the spool.

2. The first valve of claim 1, wherein when the spool is in the first position the first valve is in an open state enabling a flow of hydraulic fluid from the supply line to the second valve or to the hydraulic motor.

3. The first valve of claim 1, wherein when the spool is in the second position the first valve is in a closed state, preventing a flow of hydraulic fluid from the supply line to the second valve or to the hydraulic motor.

4. The first valve of claim 1, wherein the first valve is a shut-off valve.

5. The first valve of claim 1, wherein the sleeve includes:
a sleeve wall having an inner surface and an outer surface, the inner surface of the sleeve wall defining a substantially cylindrical cavity within which the spool is positioned.

6. The first valve of claim 5, wherein the fluid flow ports comprise a plurality of apertures in the sleeve wall.

7. The first valve of claim 1, wherein the spool comprises at least three stops, optionally wherein each stop is arranged to interface with a respective part of the inner surface of the sleeve wall to prevent or substantially prevent fluid flow past said stop.

8. The first valve of claim 1, further comprising:
a sixth fluid flow port for returning hydraulic fluid from the second valve.

9. The first valve of claim 1, wherein the inner surface of the sleeve wall comprises at least three protrusions, wherein each protrusion comprises one of the respective parts of the inner wall that interface with the stops of the spool.

10. The first valve of claim 1, wherein when the spool is in the first position, the first fluid flow port is in fluid communication with the second fluid flow port and each of the third, fourth and fifth fluid flow ports are closed.

11. The first valve of claim 1, the spool comprising a first stop, a second stop and a third stop;
wherein the first stop, the second stop and the third stop are arranged on the spool such that, when the spool is in the first position:
the first stop interfaces with the inner surface of the sleeve wall between the second fluid flow port and the third fluid flow port;
the second stop interfaces with the inner surface of the sleeve wall between the third fluid flow port and the fourth fluid flow port; and
the third stop interfaces with the inner surface of the sleeve wall between the fourth fluid flow port and the fifth fluid flow port; and
when the spool is in the second position:
the first stop interfaces with the inner surface of the sleeve wall between the first fluid flow port and the second fluid flow port and the second stop and the third stop do not interface with the inner surface of the sleeve wall.

12. A hydraulic motor system, comprising:
a first valve, for controlling the flow of hydraulic fluid therethrough;
a hydraulic motor;
a supply line and a return line for the supply and return of hydraulic fluid to and from the hydraulic motor;
a case drain line, from the hydraulic motor, in fluid communication with the return line,
a first control line in fluid communication with a first control port of the hydraulic motor and the first valve; and
a second control line in fluid communication with a second control port of the hydraulic motor and the first valve
wherein the first valve comprises:
a substantially cylindrical sleeve;
a spool within the sleeve and arranged for linear motion along a first axis, the sleeve and the spool being coaxial along the first axis;
wherein the sleeve comprises:
a first fluid flow port for receiving hydraulic fluid from the supply line;
a second fluid flow port for supplying hydraulic fluid to a second valve for control of the hydraulic motor;
a third fluid flow port for receiving hydraulic fluid from a first control line in fluid communication with a first control port;
a fourth fluid flow port for receiving hydraulic fluid from the second control line;
a fifth fluid flow port in fluid communication with the return line;
wherein the first valve is arranged to be actuated to move the spool between a first position and a second position, wherein when the spool is in the second position, the fifth fluid flow port is in fluid communication with the second, third and fourth fluid flow ports and the first fluid flow port is closed by the spool.

13. The hydraulic motor system of claim 12, wherein when the spool is in the second position, the pressure at the first control port of the hydraulic motor, the pressure at the outlet of the hydraulic motor, the pressure of the case drain line and the pressure of the return line are equalised.

14. The hydraulic motor system of claim 12, the hydraulic motor comprising a stationary plate over which a plurality of pistons are arranged to slide and a spring-based mechanism arranged to positively urge the plurality of pistons toward the plate.

15. The hydraulic motor system of claim 12, wherein the first control line is branched from a line in fluid communication with the first control port of the hydraulic motor and the second control line is branched from a line in fluid communication with the second control port of the hydraulic motor.

* * * * *